United States Patent
Scrocca

(10) Patent No.: US 7,394,365 B2
(45) Date of Patent: Jul. 1, 2008

(54) METHOD, APPARATUS AND SYSTEM FOR OPTIMISED DETECTION OF EVENTS IN A GEOGRAPHICAL AREA

(75) Inventor: Sandro Scrocca, Rome (IT)

(73) Assignee: General Contractor S.R.L., Rome (IT), part interest ( * ) Notice: Subject to any disclaimer, the term of this patent is extended or adjusted under 35 U.S.C. 154(b) by 229 days.

(21) Appl. No.: 11/270,638

(22) Filed: Nov. 10, 2005

(65) Prior Publication Data

US 2007/0103299 A1     May 10, 2007

(51) Int. Cl.
*G08B 21/00* (2006.01)
(52) U.S. Cl. .................. 340/540; 340/601; 340/602; 340/696.3
(58) Field of Classification Search .................. None
See application file for complete search history.

(56) References Cited

U.S. PATENT DOCUMENTS

| | | | | |
|---|---|---|---|---|
| 4,300,121 A | * | 11/1981 | Fritzsche | 340/928 |
| 5,546,800 A | * | 8/1996 | Daniel | 73/170.16 |
| 6,597,305 B2 | * | 7/2003 | Szeto et al. | 342/26 R |
| 6,646,559 B2 | * | 11/2003 | Smith | 340/601 |
| 2004/0183687 A1 | * | 9/2004 | Petite et al. | 340/601 |
| 2006/0261943 A1 | * | 11/2006 | Chan | 340/539.28 |
| 2007/0103299 A1 | * | 5/2007 | Scrocca | 340/540 |

* cited by examiner

*Primary Examiner*—Julie Lieu
(74) *Attorney, Agent, or Firm*—Young & Thompson

(57) ABSTRACT

A method for detecting and monitoring events on a territory, including the use of a directional sensor movable about a vertical axis of an angle between 0° and 360° and movable about an horizontal axis between 0° and 90°, includes the steps:

A. dividing the first rotation in a first number of first angular sectors and the second rotation in a second number of second angular sectors so as to divide the territory into ring sectors;
B. scanning the territory to individuate alterations of pre-defined chemical-physical parameters with respect to reference values;
C. between the time intervals of step B, scanning the ring sectors wherein the alterations have been individuated; the territory being so cyclically scanned by step-bystep directing the directional sensor towards one or more of the ring sectors, detection of an event occurring by comparison of detected values with reference values for one or more chemical-physical parameters.

34 Claims, 2 Drawing Sheets

METHOD, APPARATUS AND SYSTEM FOR OPTIMISED DETECTION OF EVENTS IN A GEOGRAPHICAL AREA

The present invention relates to a method for optimised detection of events on a geographical area, to an apparatus employing said method and to a detection system.

More particularly, the invention concerns a method able to guarantee a scanning of a limited territory, in such a way to detect certain kind of events on the territory (e.g. fires, ice on different surfaces, hydro-thermal alteration) in an optimised way, i.e. concentrating the more frequent scanning on sub-regions, that can be modified with the passing of time. The invention further relates to an apparatus implementing the method of the invention using a (tele-) sensor and robotic means. The invention further relates to system wherein one or more apparatuses are connected to a remote processing and control unit.

As it is well known, an always more frequent needing of controlling territory and monitoring environment is due to the increase of events such as fires, safety and environment degrade, road safety (ice, tunnels).

To this end, nowadays, dedicated control systems with convenient costs have not been employed.

Particularly, the Applicant does not know systems having a capillary distribution of detection units that are efficient, reliable and economically convenient.

Even more, automatised systems do not exist able to monitor the creation of code along highways and diffusing the relevant data without violating privacy, since these systems use video shots.

Object of the present invention is that of providing a method for detecting events within a pre-determined volume solving the above-mentioned drawbacks.

Main object of the present invention is that of providing the apparatuses and instruments necessary for carrying out the method according to the invention.

Further object of the present invention is that of providing an apparatus which implements the method object of the invention.

Further object of the present invention is also that of providing a system using one or more apparatuses object of the invention.

It is subject-matter of the invention a method for detecting and monitoring events on a pre-determined territory, comprising the use of at least a directional sensor and at least a relevant device for moving said at least directional sensor with a first canonical rotation about a vertical axis of an angle between 0° and 360° and a second canonical rotation of an angle between 0° and 90° about an horizontal axis perpendicular to the laying direction of said at least one directional sensor, the method comprising the step:

A. dividing said first rotation in a first number of first angular sectors and said second rotation in a second number of second angular sectors so as to divide the territory into ring sectors;

the method being characterised in that it further comprises the following steps:

B. scanning the whole pre-determined territory, at regular time intervals, in order to individuate alterations of predefined chemical-physical parameters with respect to a set of reference values thereof;

C. between the time intervals of step B, scanning the ring sectors wherein said alterations have been individuated, with at least a first frequency of scanning;

the territory being so cyclically scanned by step-by-step directing said at least a directional sensor towards one or more of said ring sectors, detection of an event occurring by comparison of detected instantaneous values with a pre-determined set of reference values for one or more chemical-physical parameters in said territory.

According to the invention, the method can further comprise the step:

D. between the time intervals of step B, scanning the ring sectors other than those wherein said alterations have been individuated, with at least second frequency of scanning smaller than said at least a first frequency. According to the invention, different second scanning frequencies can be assigned to different groups of ring sectors, the frequencies being determined by means of the following formula:

$$f_{RS} = F_R * C_E * C_{scan} * C_W$$

where $f_{RS}$ is the scanning frequency of a single ring sector, $F_R$ is a risk factor, $C_E$ is a factor for the event typology, $C_{scan}$ is a factor related to the scanning type and the scanning time, and $C_W$ is a factor related to the weather conditions, the risk factor being preliminarily set according to the importance of the area to be controlled.

According to the invention, there can be only one second scanning frequency.

Preferably according to the invention, different first scanning frequencies are assigned to different groups of ring sectors, the frequencies being determined by means of the following formula:

$$f_{RS} = F_R * C_E * C_{scan} * C_W * g(|\Delta i\, P|)$$

where $f_{RS}$ is the scanning frequency of a single ring sector, $F_R$ is a risk factor, $C_E$ is a factor for the event typology, $C_{scan}$ is a factor related to the scanning type and the scanning time, $C_W$ is a factor related to the weather conditions, and $g(|\Delta P|)$ is a function of is the detected absolute deviation $\Delta P$ of said one or more chemical-physical parameters from a pre-defined threshold, the risk factor being preliminarily set according to the importance of the area to be controlled.

According to the invention, there can be only one first scanning frequency.

Preferably according to the invention, said first angular sectors are identical angular sectors.

Preferably according to the invention, said first identical angular sector correspond each to an angle corresponding to the focal aperture of one of said at least one directional sensor.

Preferably according to the invention, said second angular sectors are identical angular sectors.

Preferably according to the invention, said second identical angular sector correspond each to an angle corresponding to the focal aperture of one of said at least one directional sensor.

Preferably according to the invention, during step C, said ring sectors wherein said alterations have been individuated, are subjected to scanning with a resolution higher than that of step B.

Preferably according to the invention, said at least one directional sensor is each time directed toward the centre of said ring sectors.

Preferably according to the invention, the method comprises the use of one or more not directional sectors.

Preferably according to the invention, at the beginning of step B, said at least one directional sensor is calibrated by measuring one or more chemical-physical parameters of a pre-determined, point-like territory remote zone at the ground level or above the ground level, said chemical-physical parameter being also measured by said at least one not directional sensor provided in said remote zone.

Preferably according to the invention, at least two directional sensors are moved, for example a standard camera and an infrared thermo-camera. Preferably according to the invention, individuation of the position of a detected event is made using the polar co-ordinates obtained by the programming of the motion of said at least one directional sensor.

Preferably according to the invention, positions of detected events are displayed overlapping the same on a two-dimensional territorial map, reconstructing on said map said ring sectors.

It is further specific subject-matter of the invention an apparatus for detecting and monitoring events on a territory, comprising a data survey fixed station, provided with at least a directional sensor, characterised in that it implements the method subject-matter of the invention.

Preferably according to the invention, said at least a directional sensor is an optical sensor, particularly an infrared sensor.

Preferably according to the invention, said at least one directional sensor is a variable focus sensor.

Preferably according to the invention, said at least one directional sensor is a temperature sensor.

Preferably according to the invention, said fixed data survey station comprises a metallic support element at the top of which a container (mainly a metallic container) is housed, within which said at least one directional sensor as well as a motion robotics for said sensor are provided.

Preferably according to the invention, said support element are provided with electric self-supplying photovoltaic panels.

Preferably according to the invention, the apparatus comprises one or more not directional sensors.

Preferably according to the invention, the apparatus comprises local elaboration electronic unit, the step-by-step scanning of ring sectors being implemented so that the sensor is moved as soon as the buffer, wherein the relevant image is loaded, is full.

It is further specific subject-matter of the invention a system for detecting and monitoring events on a territory, characterised in that it comprises one or more apparatuses according to the subject-matter of the invention, the system further comprising a central unit processing the information received from said one or more detection stations.

Preferably according to the invention, each one of said one or more stations comprises a local processor suitable to carry out a pre-processing of the meaningful data to be transmitted to the central processing unit.

Preferably according to the invention, transmission of said meaningful data occurs by a detection data transmission modem provided in each site.

Preferably according to the invention, said transmission occurs by a fixed telephony or by mobile telephones.

Preferably according to the invention, said meaningful data are received by a receiving unit.

Preferably according to the invention, said meaningful data are transmitted by the receiving unit to a data switching unit, sending the data to the central unit comprising at least on electronic processor and/or storing them within a storage memory depending on detection of events on territory.

Preferably according to the invention, each one of said one or more control stations comprises a laser laying system for controlling the proper scanning of said at least one directional sensor.

Preferably according to the invention, territory positioning of the control stations is made according to a prearranged geometric matrix with linked nodes.

The invention will be described for illustrative and not limitative purposes with reference to the drawing of the enclosed figures, wherein.

Detection method, preferably remote sensing, according to the invention comprises a preliminary step of setting the detection modes depending on the territory ambit, on the strategies and on the control priority.

Detection modes and subsequently detected data are respectively processed and superimposed to a geo-altimetric, territorial configuration of the spatial model to be controlled, for example in a planimetric-altimetrical form or altimetrical form and in a form by altimetrical section profiles.

In function of the environment priorities, spatial orientation of a sensor is programmed, and scanning frequency of zones and width of detection are determined.

Figure 1:
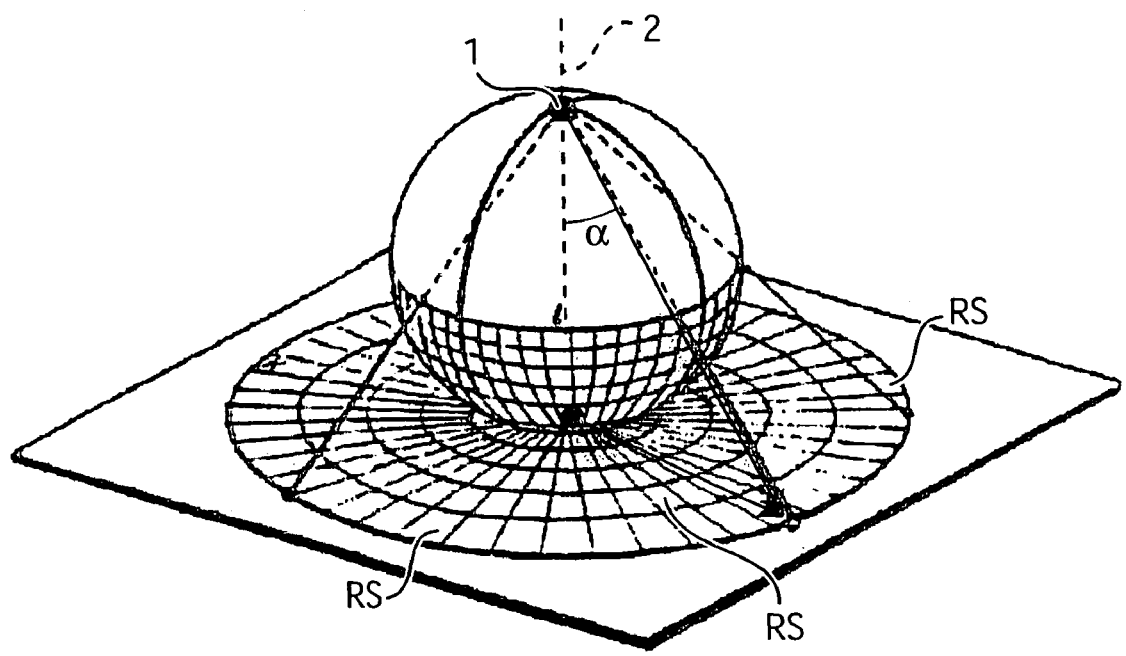
FIG. 1 shows a zone subjected to scanning by the method according to the present invention.

Making reference to FIG. 1, method comprises the use of sensor 1. It is operated by means able to make them canonical movements, i.e. a first rotation about a vertical axis 2 (an axis perpendicular to the ground) and a second rotation with respect to an axis perpendicular to the first one and to the laying direction. This second rotation moves the sensor of an α angle, preferably between 0° and 80° with respect to the position in correspondence of which the sensor is directed vertically towards the ground, so as to subject to scanning an essentially conical volume. Distance range, within which tested sensor works, corresponds to these limits.

Sensor tested in this embodiment was an infrared sensor that can be employed with any lighting condition. Furthermore, an optical sensor can be employed for monitoring the formation of queues along the roads, avoiding that the diffusion of the relevant information can infringe the privacy rules, since it concerns temperature data that, fallin within predetermined intervals and configuration ranges, indicate the presence of the same queues.

In order to efficiently treat the data, territory to be controlled is divided into scanning sectors.

Said scanning sectors can be differently chosen, but a particularly efficient choose, thus particularly optimising the detection, is that of dividing the scanning about the vertical axis in a pre-determined number of angular sectors, each angular sector corresponding to the focal opening angle of the optical sensor.

It has been tested a division into 16 angular sectors, each one of 22.5° with the above-mentioned infrared sensor.

At the same time, second rotation has been divided into equal angular sectors, always in function of the focal opening of the sensor.

Instead, for the tested infrared sensor, 4 sectors, each one of 20°, have been chosen (zenithal movement).

From such a choice results a subdivision in ring sectors RS of the territory to be scanned, as shown in FIG. 1, said sectors becoming always larger departing from the sensor position.

Sensor is thus moved in such a way that it for example always is directed toward the centre of said corona circular scanning sectors.

Said division into corona circular scanning sectors not only has an advantage for the scanning efficiency, but it is particularly advantageous for an easy reconstruction of the data on a pre-determined map of the scanned territory.

Furthermore, in this way it is possible determining the movement time from one zone to another one, as well as the exact succession of the scannings.

In the system according to the invention, this advantage is correlated with a further coupling for motion.

In fact, sensor requires a certain time for detecting an image corresponding to a scanning zone. After this time, system moves the sensor in such a way that it passes to the following corona circular sector. The above can be particularly realised in such a way that motion starts in the processing local unit from the moment when the loading buffer is full. Scanning modes are further such to maximise the remote sensing definition, the frequency and precision of scanning where it is necessary for detecting meaningful events.

To this end, it is preferable making a preliminary atmospheric scanning, for preliminarily verifying critical atmospheric alterations (for example smokes, temperatures).

Said scanning can occur all along the volume defined by the above rotations, or only on part of it.

Individuation of critical volumes or areas, more generally of meaningful events can be made by a comparison of the standard image with the image detected of the micro zone temperatures.

Thus detections are preferably concentrated in correspondence of said critical volumes. It can be made both subjecting to scanning exclusively said volumes, and subjecting to scanning them with a higher frequency with respect to other volumes.

A local analyses of the detection site allows the recognition of the thermal events determining the alarm for example on the basis of critical levels set for temperature classes.

The numerical ratio between the scanning frequency of the sectors wherein an alteration has been detected and that of the other sectors can be pre-set in the system, as a function of pre-defined priorities, temperature level and security thresholds. It can be also automatically (e.g. on-the-fly) calculated by the system using the following relation:

$$f_{RS} = F_R * C_E * C_{scan} * C_W * \Delta T$$

where $f_{RS}$ is the scanning frequency of a single ring sector, $F_R$ is a risk factor, $C_E$ is a factor for the event typology, $C_{scan}$ is a factor related to the scanning type and the scanning time, $C_W$ is a factor related to the weather conditions, and $\Delta T$ is the detected absolute deviation of the temperature (e.g. with respect to a previous scanning—another parameter can be used). The risk factor is preliminarily set according to the importance of the area to be controlled.

In a preferred embodiment, the territory is subdivided into 4 ring areas, each one further sub-divided into 8 ring sectors, i.e. the territory is divided into 32 ring sectors. The scanning of a sector preferably takes around 2 s, the pointing time is of around 10 s, the initial auto-reset and calibration time is of around 10 s, and the move time between ring areas is of around 5 s. The total scanning time for the whole territory, in this preferred embodiment, of around 158 s.

However, this time can be automatically modified as a function of the detected alterations of critical parameters, as explained above. In this concern, it is possible to define several scanning sub-frequencies according to different levels of events' likelihood, so that different scanning frequencies are assigned to different groups of sectors.

Such groups are not fixed a priori and can vary during the cyclical scanning. For example, if an alteration is detected in a sector in a first scanning cycle and not it is no longer detected in a sub-sequent cycle, such a sector will be moved in another group, i.e. it will be scanned with another frequency.

Concerning the threshold values used to detect above alterations, the method according to the invention e.g. controls preferably a temperature variation of +/−0.5° C. for ice, the presence of a temperature larger that 100° C. for fire, or a temperature variation with respect to a security threshold.

Individuation of the event position occurs by the polar co-ordinates obtained by the programming of the motion of the sensor on the azymuthal plane and on the zenithal plane.

Figure 2:
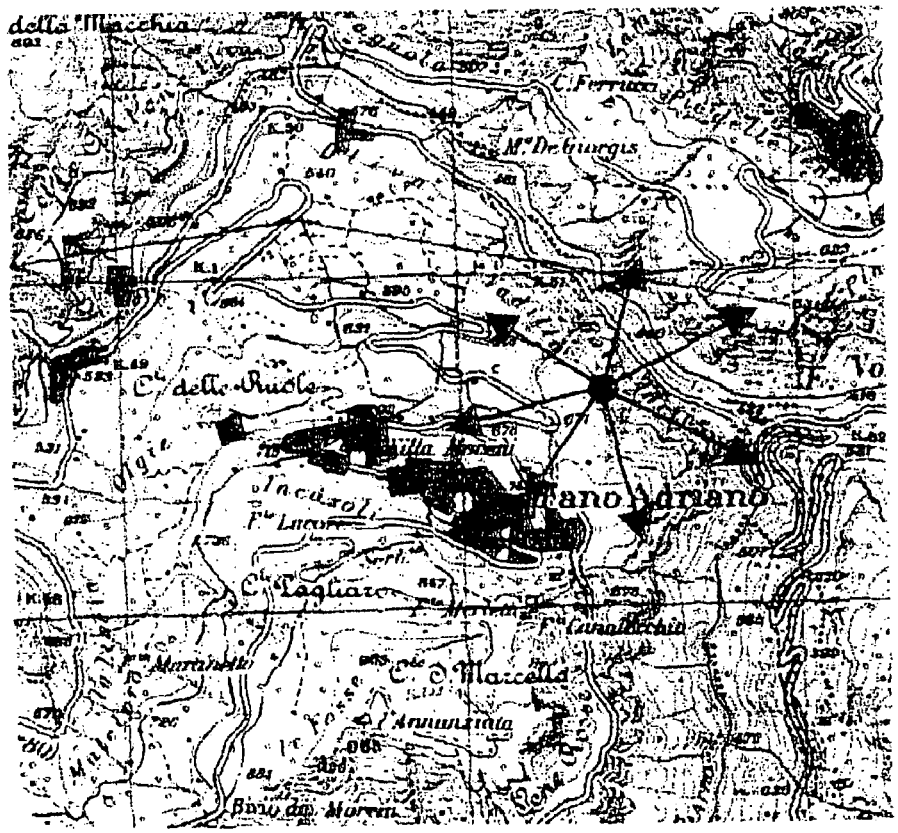
FIG. 2 shows an example of overlapping of the scanning field according to FIG. 1 with a bidimensional territory map.

Controlled area is shown in FIG. 2, on a territory map.

Sensor employed is preferably an optical sensor, still more preferably an infrared sensor, remote detecting the temperature, preferably at a distance between 1 and 5 km. It is provided with predefinition of detectable thermal level that can be examined at time intervals by processing software.

For each scanning radial—annular cycle as described in the above, it is possible an initial calibration directing the sensor toward a reference point (or zone with very small dimensions) not too wherein it is provided another sensor controlling the temperature (or other physical parameter taken into consideration, for example relative humidity, luminosity and wind speed) of said point. In this way, at the beginning of each scanning cycle, detection is calibrated again and the following detection is reliable.

Figure 3:
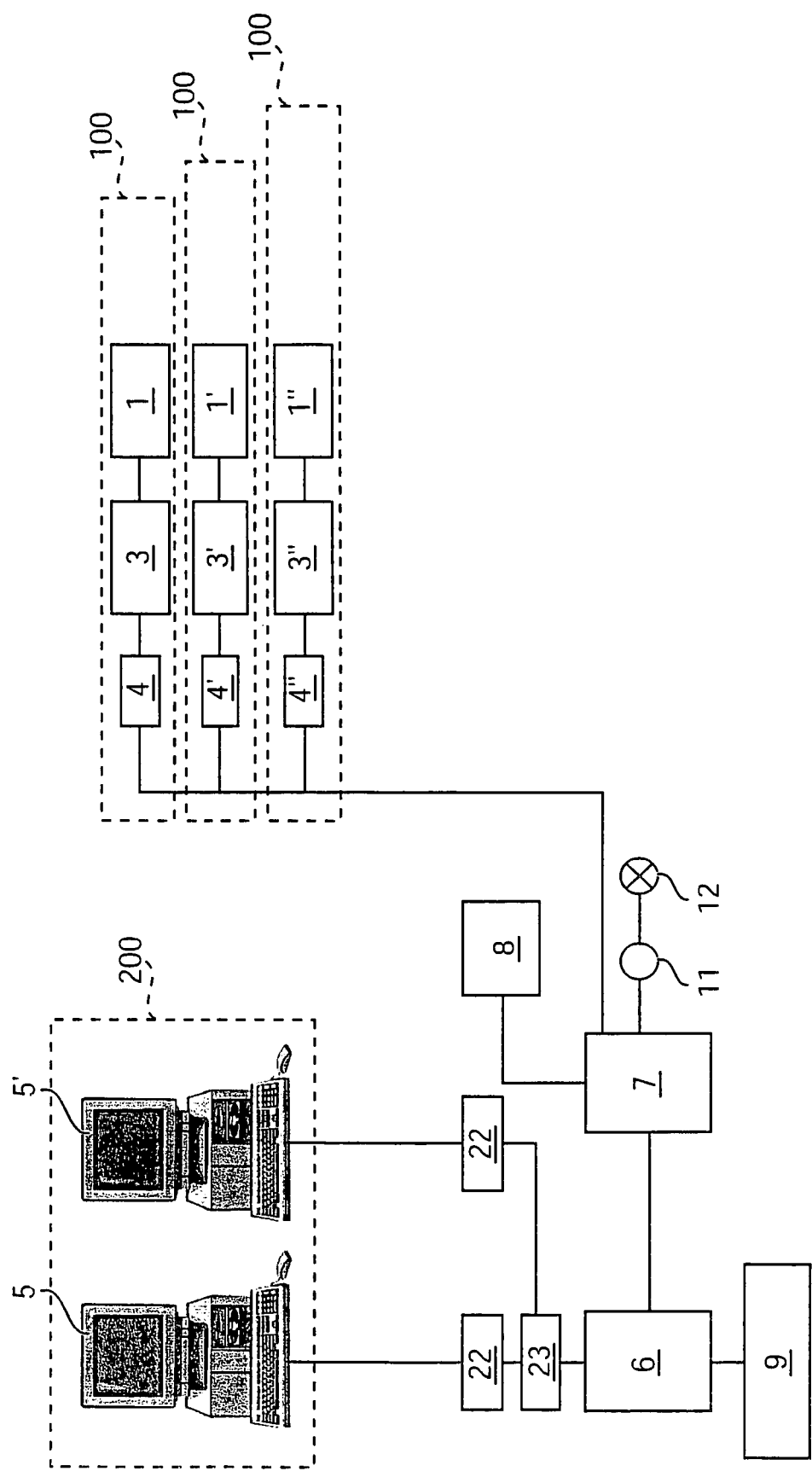
FIG. 3 shows the block diagram of the apparatus according to an embodiment of the invention.

Making reference to FIG. 3, an embodiment of the apparatus according to the invention provides self-powered data detection fixed positions 100, and a central unit 200 processing the information transmitted to the fixed positions 100 placed on territory, by which interesting events are detected.

Information associated to each station comprise:
position of the station (area/territory to be controlled), also identified by an identification number;
integrated aero-photo-grammetric and satellite individuation of events;
meaningful data and alarms;
operative, didactic and informative notes;
map with auxiliary sites (for example equipped with reachability, intervention devices, emergency shelters, first aid fixtures).

Besides the above maps, within the area to be monitored, maps containing information about themes concerning to the environment to be controlled and monitored with reference to the territory patrimony (theme maps). Said cartographies can also be configured with user interactive modes.

Control site 100 is comprised of a metallic support element at the top of which an outside, proof container (mainly a metallic container) and for example with a hemispherical shape; it is provided with a protection part on which possible photovoltaic panels could be inserted for electric supply of the system; within said container sensor 1, 1', 1", motion robotics (not shown in the figure) and a local electronic processor 3, 3', 3", can be housed.

It is further provided the presence of a modem 4, 4', 4" for transmission of data detected by a fixed telephony or mobile telephone to the central processing unit 200, as well as emergency electric supply accumulators (not shown).

Receipt of data occurs in a receipt unit 7, that can be controlled by a control panel 8, receiving data both from sensors, 1', 1", preferably thermal sensors, and from other sensors (for example one or more smoke optic sensors 11, one or more multicriteria sensors 12, for example integrated multicriteria sensors anti-vandalism, smoke and temperature). These data are transmitted to the switching unit 6, sending the data to the processors 5, 5' included in the processing central unit 200 (by the gateway divider 23 and protocol converter gateways 22) and/or stores them into a local and/or remote storing memory 9.

Each control site 100 can take advantage of a possible laser laying system, for controlling the proper sensor 1, 1', 1" laying.

Territorial positioning of control sites 100 is made according to a preordained geometric matrix with linked nodes.

Total control of site is assigned to a self-diagnosis software for periodic control of the proper operation of the site in robotics motion and data transmission.

It is further possible the implementation of auxiliary control devices for controlling for example microclimate, hydrothermal, water bed, anti-vandalism, smokes, atmosphere, sun radiation.

Detection sites can control as an average a circular surface of about 300 hectares and their position on territory must be configured on the basis of local environmental control strategies (pattern, linear, punctiform extension); functionality of a system of stations is co-ordinated in progression of scannings.

As described in the above, scanning of territory surface occurs by concentric radial—annular motion of the tele-detection thermal sensor 1, 1', 1".

Meaningful data of the event are transmitted by mobile telephone (for example optical fibre, fixed telephony, GSM, GPRS or UMTS, or other telecommunication system): they concern thermal entity of the event, detected image and polar co-ordinates of the event with respect to the emitting site individuated by an identification code.

Before the control central unit 200, by the reception of the above data, sent from a site 100, superimposition is displayed on the monitor of the positioning of the event on the 2D thematic cartography prepared in order to intelligible individuation and interpretation of the event generating the alarm.

By said processing, progressive cognitive deepening steps can be carried out:

1. simple cartographique individuation;
2. representation of paths allowing the preferential reachability as far as time and best access are concerned;
3. transmission of informative messages, visualisation of sites and of intervention and support means kind available, close to the event.

Periodic collection of total data is memorised in a suitable hardware file. Said collection could be used for statistic, preventive, environmental, and hydro geological applicative extensions.

Apparatus described is thus addressed to the informatised territorial control for multifunction monitoring, particularly hydrothermal, anti-fire, road safety and environmental safety monitoring.

An important application of the method and apparatus according to the invention is realised by using a distance laser sensor, which can be used in an opposite way with respect to the functionality for which it has been constructed. Indeed, reduced road visibility conditions are generally due to considerable atmospheric "densities" caused by rain, snow and high values of relative humidity with condensation phenomenon (fog). In such cases, by means of a predefined laying of the apparatus operated by the relevant robotics, the measuring laser beam is not correctly reflexed, and do not result any measured distance: this fact is used in the present invention to automatically detect the presence of reduced road visibility conditions.

Further, the same system, by discriminating both the points (or directions) for which distances cannot be detected and the points for which distances can be detected, allow to calculate the average levels of local visibility in the above-mentioned weather conditions.

A very important particular application is detection and monitoring of ice on the road. In fact, by the system according to the invention, it is possible detecting temperature of a scanning zone and, thanks to an auxiliary sensor, also the relative humidity in said scanning zone.

By using these data in combination with the known Glaser diagram, presence of ice on the ground can be inferred in function of the calculation of condensation (dew temperature) phenomenon, of steam contained in atmosphere, of surfaces subjected to scanning.

It is further possible calibrating the infrared sensor beforehand, by using the relative humidity data.

Particularly, it is allowed the use of devices provided with energetic autonomy, for local processing of environment and spatial meaningful data for detecting of events to be monitored, such as safety, anti-fire, territory, hydrogeology, environmental alterations, microclimate.

Finally, use of the apparatus according to the invention (informatised and automatised territory environmental monitoring) can create with passing of time a strategic data file for environmental monitoring.

The present invention has been described for illustrative but not limitative purposes, according to its preferred embodiments, but it is to be understood that modifications and/or changes can be introduced by those skilled in the art without departing from the relevant scope as defined in the enclosed claims.

The invention claimed is:

1. Method for detecting and monitoring events on a predetermined territory, comprising the use of at least a directional sensor (1,1',1") and at least a relevant device for moving said at least directional sensor (1,1',1") with a first canonical rotation about a vertical axis (2) of an angle between 0° and 360° and a second canonical rotation of an angle ($\alpha$) between 0° and 90 about an horizontal axis perpendicular to the laying direction of said at least one directional sensor (1,1',1"), the method comprising the step:

A. dividing said first rotation in a first number of first angular sectors and said second rotation in a second number of second angular sectors so as to divide the territory into ring sectors (RS);

the method being characterized in that it further comprises the following steps:

B. scanning the whole predetermined territory, at regular time intervals, in order to individuate alterations of predefined chemical-physical parameters with respect to a set of reference values thereof;

C. between the time intervals of step B, scanning the ring sectors (RS) wherein said alterations have been individuated, with at least a first frequency of scanning;

the territory being so cyclically scanned by step-by-step directing said at least a directional sensor (1,1',1") towards one or more of said ring sectors (RS), detection of an event occurring by comparison of detected instantaneous values with a predetermined set of reference values for one or more chemical-physical parameters in said territory.

2. Method according to claim 1, characterised in that it further comprises the step:

D. between the time intervals of step B, scanning the ring sectors other than those wherein said alterations have been individuated, with at least second frequency of scanning smaller than said at least a first frequency.

3. Method according to claim 2, characterised in that different second scanning frequencies are assigned to different groups of ring sectors, the frequencies being determined by means of the following formula:

$$f_{RS}=F_R*C_E*C_{scan}*C_W$$

where $f_{RS}$ is the scanning frequency of a single ring sector, $F_R$ is a risk factor, $C_E$ is a factor for the event typology, $C_{scan}$ is a factor related to the scanning type and the scanning time, and $C_W$ is a factor related to the weather conditions, the risk factor being preliminarily set according to the importance of the area to be controlled.

4. Method according to claim 2, characterised in that there is only one second scanning frequency.

5. Method according to claim 1, characterised in that different first scanning frequencies are assigned to different groups of ring sectors, the frequencies being determined by means of the following formula:

$$f_{RS}=F_R*C_E*C_{scan}*C_W*g(|\Delta P|)$$

where IRS is the scanning frequency of a single ring sector, $F_R$ is a risk factor, $C_E$ is a factor for the event typology, $C_{scan}$ is a factor related to the scanning type and the scanning time, $C_W$ is a factor related to the weather conditions, and $g(|\Delta P|)$ is a function of is the detected absolute deviation $\Delta P$ of said one or more chemical-physical parameters from a pre-defined threshold, the risk factor being preliminarily set according to the importance of the area to be controlled.

6. Method according to claim 1, characterised in that there is only one first scanning frequency.

7. Method according to claim 1, characterised in that said second rotation is a rotation of an angle ($\alpha$) between 0° and 80°.

8. Method according to claim 1, characterised in that said first angular sectors are identical angular sectors.

9. Method according to claim 8, characterised in that said first identical angular sector correspond each to an angle corresponding to the focal aperture of one of said at least one directional sensor (1,1',1").

10. Method according to claim 1, characterised in that said second angular sectors are identical angular sectors.

11. Method according to claim 10, characterised in that said second identical angular sector correspond each to an angle corresponding to the focal aperture of one of said at least one directional sensor (1,1',1").

12. Method according to claim 1, characterised in that during step C, said ring sectors wherein said alterations have been individuated, are subjected to scanning with a resolution higher than that of step B.

13. Method according to claim 1, characterised in that said at least one directional sensor (1,1',1") is each time directed toward the centre of said ring sectors.

14. Method according to claim 1, characterised in that the method comprises the use of one or more not directional sectors.

15. Method according to claim 14, characterised in that, at the beginning of step B, said at least one directional sensor (1,1',1") is calibrated by measuring one or more chemical-physical parameters of a pre-determined, point-like territory remote zone at the ground level or above the ground level, said chemical-physical parameter being also measured by said at least one not directional sensor provided in said remote zone.

16. Method according to claim 1, characterised in that at least two directional sensors (1,1',1") are moved, for example a standard telecamera and an infrared thermo-camera.

17. Method according to claim 1, characterised in that individuation of the position of a detected event is made using the polar co-ordinates obtained by the programming of the motion of said at least one directional sensor (1,1',1").

18. Method according to claim 1, characterised in that positions of detected events are displayed overlapping the same on a two-dimensional territorial map, reconstructing on said map said ring sectors.

19. Apparatus for detecting and monitoring events on a predetermined territory, comprising:
    a data survey fixed station (100),
    at least a directional sensor (1,1',1") provided at the survey fixed station,
    at least a relevant device for moving said at least directional sensor (1,1',1") with a first canonical rotation about a vertical axis (2) of an angle between 0° and 360° and a second canonical rotation of an angle ($\alpha$) between 0° and 90° about an horizontal axis perpendicular to the laying direction of said at least one directional sensor (1,1',1"), and
    parts configured A.dividing said first rotation in a first number of first angular sectors and said second rotation in a second number of second angular sectors so as to divide the territory into ring sectors (RS); B.scanning the whole pre-determined territory, at regular time intervals, in order to individuate alterations of predefined chemical-physical parameters with respect to a set of reference values thereof; and C.between the time intervals, scanning the ring sectors (RS) wherein said alterations have been individuated, with at least a first frequency of scanning, wherein the territory is so cyclically scanned by step-by-step directing said at least a directional sensor (1,1',1") towards one or more of said ring sectors (RS), detection of an event occurring by comparison of detected instantaneous values with a pre-determined set of reference values for one or more chemical-physical parameters in said territory.

20. Apparatus according to claim 19, characterised in that said at least a directional sensor (1,1',1") is an optical sensor, particularly an infrared sensor.

21. Apparatus according to claim 20, characterised in that said at least one directional sensor (1,1',1") is a variable focus sensor.

22. Apparatus according to claim 19, characterised in that said at least one directional sensor (1,1',1") is a temperature sensor.

23. Apparatus according to claim 19, characterised in that said fixed data survey station comprises a metallic support element at the top of which a container (mainly a metallic container) is housed, within which said at least one directional sensor (1,1',1") as well as a motion robotics for said sensor (1,1',1") are provided.

24. Apparatus according to claim 23, characterised in that said support element are provided with electric self-supplying photovoltaic panels.

25. Apparatus according to claim 19, characterised in that the apparatus comprises one or more not directional sensors.

26. Apparatus according to claim 19, characterised in that it comprises local elaboration electronic unit, the step-by-step scanning of ring sectors being implemented so that the sensor is moved as soon as the buffer, wherein the relevant image is loaded, is full.

27. System for detecting and monitoring events on a territory, characterised in that it comprises one or more apparatuses according to claim 19, the system further comprising a central unit (200) processing the information received from said one or more detection stations (100).

28. System according to claim 27, characterised in that each one of said one or more stations comprises a local processor (3, 3', 3") suitable to carry out a pre-processing of the meaningful data to be transmitted to the central processing unit (200).

29. System according to claim 28, characterised in that transmission of said meaningful data occurs by a detection data transmission modem (4, 4', 4") provided in each site.

30. System according to claim 29, characterised in that said transmission occurs by a fixed telephony or by mobile telephones.

31. System according to claim 30, characterised in that said meaningful data are received by a receiving unit (7).

32. System according to claim 31, characterised in that said meaningful data are transmitted by the receiving unit (7) to a data switching unit (6), sending the data to the central unit (200) comprising at least on electronic processor (5, 5') and/or storing them within a storage memory (9) depending on detection of events on territory.

33. System according to claim 27, characterised in that each one of said one or more control stations comprises a laser laying system for controlling the proper scanning of said at least one directional sensor (1,1',1").

34. System according to claim 27, characterised in that territory positioning of the control stations can be made according to a prearranged geometric matrix with linked nodes.

* * * * *